United States Patent
Mori et al.

(10) Patent No.: US 7,424,118 B2
(45) Date of Patent: Sep. 9, 2008

(54) MOVING OBJECT EQUIPPED WITH ULTRA-DIRECTIONAL SPEAKER

(75) Inventors: Kiyofumi Mori, Tokyo (JP); Shunji Yoshida, Tokyo (JP); Hiroshi Okuno, Kyoto (JP); Kazuhiro Nakadai, Saitama (JP); Hiroshi Tsujino, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 69 days.

(21) Appl. No.: 10/588,816

(22) PCT Filed: Feb. 10, 2005

(86) PCT No.: PCT/JP2005/002043

§ 371 (c)(1),
(2), (4) Date: Aug. 9, 2006

(87) PCT Pub. No.: WO2005/076660

PCT Pub. Date: Aug. 18, 2005

(65) Prior Publication Data

US 2007/0172076 A1    Jul. 26, 2007

(30) Foreign Application Priority Data

Feb. 10, 2004    (JP) ............... 2004-033966

(51) Int. Cl.
*H04B 3/00* (2006.01)
(52) U.S. Cl. ............... 381/77; 381/79; 381/104
(58) Field of Classification Search ............... 381/303, 381/150, 77–80, 82, 104–107, 56; 367/137, 367/134
See application file for complete search history.

(56) References Cited

U.S. PATENT DOCUMENTS

| | | | | |
|---|---|---|---|---|
| 6,052,336 A | * | 4/2000 | Lowrey, III | 367/139 |
| 6,409,687 B1 | * | 6/2002 | Foxlin | 600/595 |
| 6,445,804 B1 | * | 9/2002 | Hirayanagi | 381/303 |
| 6,678,381 B1 | * | 1/2004 | Manabe | 381/77 |
| 7,130,705 B2 | * | 10/2006 | Amir et al. | 700/94 |
| 2005/0129254 A1 | * | 6/2005 | Connor et al. | 381/77 |

FOREIGN PATENT DOCUMENTS

| | | |
|---|---|---|
| JP | 11-258101 A | 9/1999 |
| JP | 2001-346288 A | 12/2001 |
| JP | 2002-264058 A | 9/2002 |
| JP | 2003-251583 A | 9/2003 |
| JP | 2003-285286 A | 10/2003 |
| JP | 2003-340764 A | 12/2003 |
| JP | 2004-286805 A | 10/2004 |
| JP | 2004-295059 A | 10/2004 |
| JP | 2004-318026 A | 11/2004 |

* cited by examiner

*Primary Examiner*—Vivian Chin
*Assistant Examiner*—Disler Paul
(74) *Attorney, Agent, or Firm*—Birch, Stewart, Kolasch & Birch, LLP

(57) ABSTRACT

A moving object 1 equipped with ultra-directional speaker is provided with an emitter 44 for measuring a distance to a target 11 to which it is to provide a voice by using an ultrasonic transmit sensor 45 and an ultrasonic receive sensor 46 thereof, and for emitting an output signal having a predetermined sound level which is adjusted by an amplifier 34 with sound level adjusting function. The moving object 1 can thus transmit a voice having an optimal volume only to the specific target through parametric action.

7 Claims, 8 Drawing Sheets (a) NONDIRECTIONAL SPEAKER    (b) ULTRA-DIRECTIONAL SPEAKER

FIG. 10
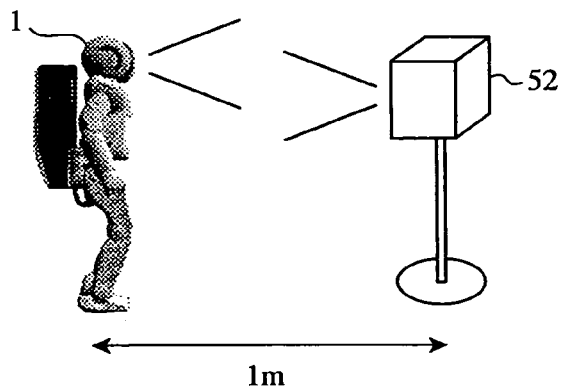
FIG. 11
| ROBOT-SIDE SPEAKER | | |
|---|---|---|
| NONDIRECTIONAL SPEAKER | 70dBA | 62dBA |
| ULTRA-DIRECTIONAL SPEAKER (MAXIMUM OUTPUT) | 58dBA | 70dBA |
| ULTRA-DIRECTIONAL SPEAKER (GAIN CONTROL) | 56dBA | 62dBA |
| SWITCHING ON OF ROBOT | 55dBA | 51dBA |
| BACKGROUND NOISE | 23dBA | 23dBA |
FIG. 12
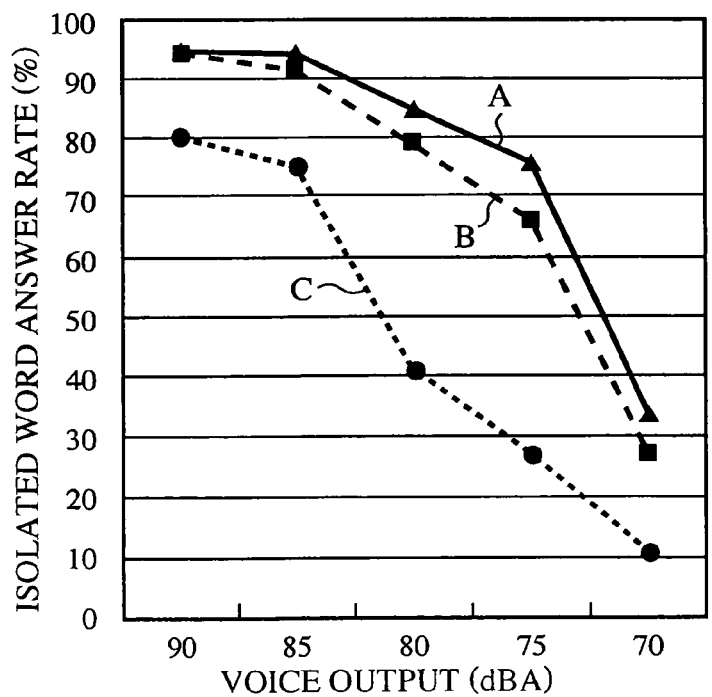

MOVING OBJECT EQUIPPED WITH ULTRA-DIRECTIONAL SPEAKER

FIELD OF THE INVENTION

The present invention relates to a moving-object-mounted sound apparatus equipped with an ultra-directional speaker for directionally emitting out an audible sound, the sound apparatus being mounted in a moving object having a person-tracking function.

BACKGROUND OF THE INVENTION

Nondirectional speakers which spreadly emit out a voice in a direction in which an emitter is oriented have been widely used. On the other hand, there have been provided ultra-directional speakers which provide high directivity using the principle of parametric speakers. An ultra-directional speaker generates a sound having frequencies within the range of human hearing by using distortion components which are generated when a strong ultrasonic wave propagates through the air, and concentrates the generated sound to a front side thereof and makes it propagate, thereby offering sounds having high directivity. Such a parametric speaker is disclosed by, for example, patent reference 1.

A robot equipped with audiovisual system is disclosed by, for example, patent reference 2. This moving object equipped with audiovisual system can carry out a real-time process of performing visual and sound tracking on a target. This system also has a technology for unifying several pieces of sensor information about a visual sensor, an audio sensor, a motor sensor, etc., and, even if any one of the plural pieces of sensor information is lost, continuing the tracking by complementing the lost piece of sensor information.

Patent reference 1: JP,2001-346288,A
Patent reference 2: JP,2002-264058,A

Since a speaker which is mounted in a related art moving object is a low-directional speaker, a voice generated by the related art speaker reaches an indefinite number of things which exist around the moving object. For this reason, a related art speaker cannot provide voice information for a specific limited region.

In general, a related art ultra-directional speaker emits a voice in directions which are limited only to a region having an angle of 20 degrees in a direction of the front of an emitter, and does not have a function of automatically changing the direction of the front of the emitter to a direction in which the voice is to be emitted.

Conventionally, the adjustment of the level of the voice generated by the emitter of the related art ultra-directional speaker is manually performed, and the related art ultra-directional speaker does not have any function of adjusting the voice level according to a position to which the related art ultra-directional speaker provides the sound.

In addition, a problem with a case where a low-directional speaker is applied to a talking device of a robot communications system is that it is difficult for the robot communications system to recognize a voice from another sound source while the talking device is making a voice. To be more specific, a robot's microphone is disposed closer to the robot's drive motor compared with other sound sources, such as a partner to which the robot is talking. As a result, even if the absolute power of noise caused by the drive motor is small compared with those of other sound sources, the power of the motor noise collected by the microphone becomes relatively large and has an influence on voice recognition.

In addition, since the low-directional speaker emits a voice so that the voice can reach a partner to which the robot is going to talk, the output power of the voice is set to be large than that of the motor noise. Since such a voice outputted by the robot becomes noise at the time of recognizing a voice from the partner, the signal-to-noise (S/N) ratio becomes small as a result and it is therefore difficult for the robot to perform voice recognition. For this reason, a related art robot with a low-directional speaker turns off a hearing function while it is talking with a partner, or recognizes a voice from the partner by receiving it via not-the robot's microphone, but the microphone of a head set or the like, which is placed in the vicinity of the partner's month.

The present invention is made in order to solve the above-mentioned problems, and it is therefore an object of the present invention to provide an ultra-directional sound system that can surely provide a voice to a moving target to which the voice is to be provided, and which can provide voice information having an optimal volume in a direction of the target to which the voice is to be provided.

It is another object of the present invention to provide a moving object equipped with ultra-directional speaker which constitutes a robot communications system which implements a simultaneous dialog function and a high-concealment whispering function.

DISCLOSURE OF THE INVENTION

A moving object equipped with ultra-directional speaker in accordance with the present invention includes a modulator for modulating an ultrasonic carrier signal with an input electric signal from an audible sound signal source, and an emitter for emitting an output signal of the modulator. Therefore, the present invention offers an advantage of being able to provide a specific voice to a specific audience by sending the voice from the moving object by using the ultra-directional speaker.

The moving object equipped with ultra-directional speaker in accordance with the present invention includes a voice detecting means, a target direction detecting means for detecting a direction of a target to which a voice is to be provided, and an emitter orientation control means for controlling the emitter so that the emitter is oriented toward the target which is identified by the target direction detecting means. According to this structure, the moving object can surely transmit a voice to a target which is moving by detecting a voice from the target, detecting the direction of the target to which information is to be provided, and controlling the orientation of the emitter.

In the moving object equipped with ultra-directional speaker in accordance with the present invention, the emitter is provided with two or more ultrasonic vibration elements, and at least one of the two or more ultrasonic vibration elements can be used as an ultrasonic receive sensor and at least one of the two or more ultrasonic vibration elements can be used as an ultrasonic transmit sensor. Therefore, the moving object can correctly measure the distance between the emitter and the target to which information is to be provided, and the moving object can be made to be compact in size.

The moving object equipped with ultra-directional speaker in accordance with the present invention includes a sound level adjustment means for adjusting a level of an output voice which is to be transmitted by the emitter, and a distance detecting means for measuring a distance to the target on the basis of a reception of a reflected wave of an ultrasonic wave outputted from an ultrasonic vibration element and reflected by the target, the sound level adjustment means adjusting the level of the output voice according to an output of the distance detecting means. According to this structure, the moving object can transmit voice information with an optimal volume, which is set in consideration of the distance to the target, to the target.

The moving object equipped with ultra-directional speaker in accordance with the present invention includes an automatic gain control means for controlling gain adjustment of the level of the output voice adjusted by the sound level adjustment means according to the output of the distance detecting means. Therefore, since the moving object which is constructed as above can reduce reflections of the output ultrasonic wave, it can appropriately implement a whispering function of transmitting the output voice only to the target and a simultaneous dialog function.

The moving object equipped with ultra-directional speaker in accordance with the present invention includes a voice recognition and generation means for performing voice recognition on a voice detected by a voice detecting means, and for generating a voice signal which is to be transmitted by the emitter. Therefore, the moving object can implement a simultaneous dialog function of receiving and recognizing the voice from the target while transmitting speech information to the target.

BRIEF DESCRIPTION OF THE FIGURES

FIG. 10 is a diagram explaining a test of an evaluation of a simultaneous dialog function of the moving object;

FIG. 11 is a table showing results of measurements of voice power at the position of a microphone and at the position of a speaker for sound source when the moving object is placed as shown in FIG. 10; and FIG. 12 is a graph showing results of isolated term recognition processing.

PREFERRED EMBODIMENTS OF THE INVENTION

Hereafter, in order to explain this invention in greater detail, the preferred embodiments of the present invention will be described with reference to the accompanying drawings.

Embodiment 1.

Figure 1:
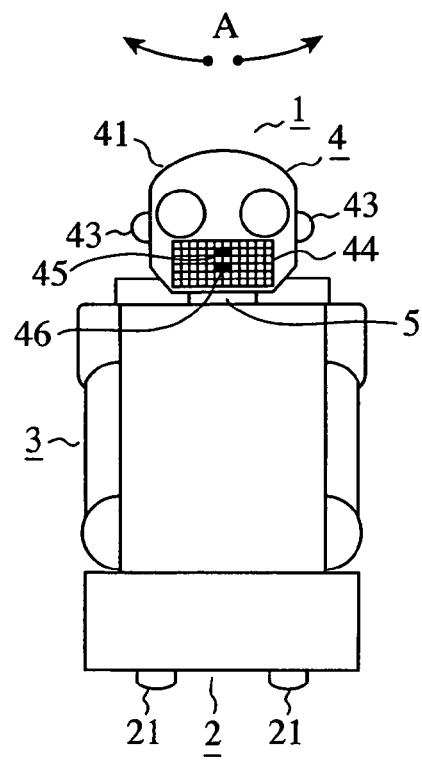
FIG. 1 is a front view of a moving object according to this embodiment 1.
Figure 2:
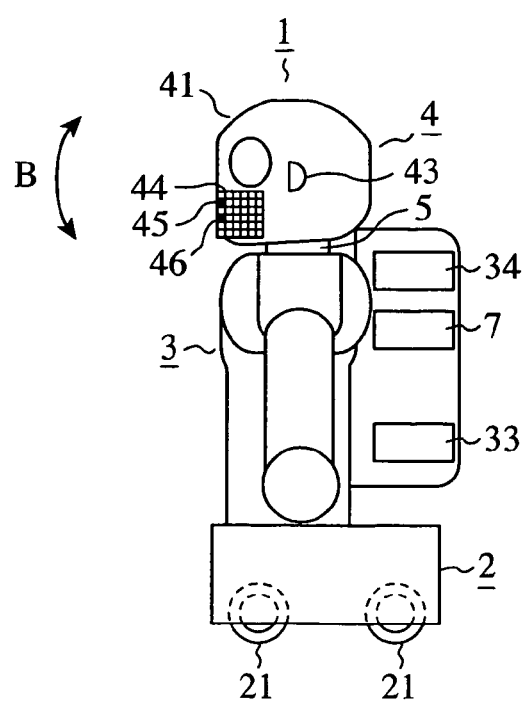
FIG. 2 is a side view of the moving object according to this embodiment 1.

FIG. 1 is a front view of a moving object according to this embodiment 1, and FIG. 2 is a side view of the moving object according to this embodiment 1. As shown in FIG. 1, the humanoid moving object 1 has a leg 2, a body 3 which is supported on the leg 2, and a head 4 which is movably supported on the body 3.

The leg 2 is provided with either two or more wheels 21 or two or more leg moving means, instead of the wheels, at a lower portion thereof, and can be moved. The body 3 is supported on and fixed to the leg 2. The head 4 is connected to the body 3 by way of a connecting member 5, and this connecting member 5 is supported on the body 3 so as to pivot around a vertical axis of the body, as indicated by arrows A. The head 4 is also supported on the connecting member 5 so as to shake in upward and downward directions, as indicated by an arrow B.

An amplifier 34 equipped with sound level adjusting function, an emitter orientation control means 7, a modulator 33, etc., which will be mentioned later in detail, are mounted on the back of the body 3.

While the whole of the head 4 is covered by an outer jacket 41, the head 4 is equipped with a pair of microphones 43 on both lateral sides thereof as the robot's hearing device. The microphones 43 are attached to the two lateral sides of the head 4, respectively, so as to have directivity in a direction that is in front of the moving object.

A parametric speaker uses an ultrasonic wave which human beings cannot hear, and adopts a principle (nonlinearity) of generating a sound having frequencies within the range of human hearing by using distortion components which are generated when a strong ultrasonic wave propagates through the air. The parametric speaker exhibits "ultra-directional" characteristics in which the generated audible sound is concentrated to a narrow area in the shape of a beam and in the direction of the emission of the sound, although it has a low degree of conversion efficiency for generating the audible sound.

A low-directional speaker which has been widely used forms a sound field in a wide area including the back thereof, as if light from a naked light bulb spreads out in all directions. For this reason, the low-directional speaker cannot control the area in which the sound field is formed. On the other hand, an ultra-directional speaker, such as a parametric speaker, can limit an area where human beings can hear to a small area as if they are spotlighted. The ultra-directional speaker in accordance with this embodiment can provide a sound field having directivity of about 20 degrees in the direction of the beam axis, for example.

Figure 3:
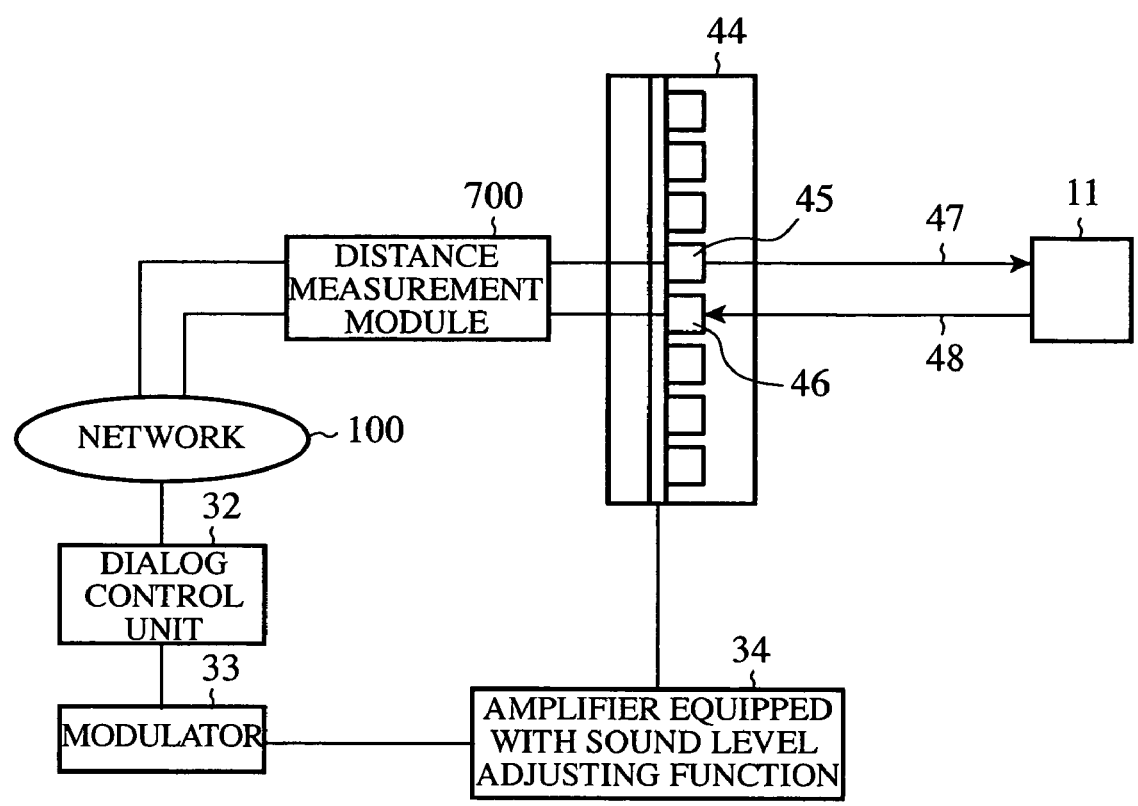
FIG. 3 is a diagram showing the structure of an ultra-directional speaker according to embodiment 1 of the present invention.

As shown in FIG. 3, the speaker system according to this embodiment 1 is provided with a dialog control unit 32, the modulator 33 for modulating an ultrasonic carrier signal with an input electric signal from the dialog control unit 32, the amplifier 34 with sound level adjusting function, for amplifying the signal modulated by the modulator 33, and an emitter 44 for converting the amplified signal into a sound wave.

Ultrasonic transmit sensors 45 and ultrasonic receive sensors 46 each using an ultrasonic transducer are disposed in the emitter 44. Each ultrasonic transmit sensor 45 sends out an ultrasonic wave 47 having a natural frequency in response an alternating voltage in the shape of a rectangle which is applied thereto. The ultrasonic wave sent out by each ultrasonic transmit sensor 45 is reflected by a target 11 to which the speaker system is to provide a voice, and is then received, as a reflected wave 48, by an ultrasonic receive sensor 46. At this time, the difference between the time of the transmission of the ultrasonic wave and the time of the reception of the ultrasonic wave is measured so as to acquire information about the distance between the moving object and the target 11 to which the speaker system is to provide a voice from the time difference. On the basis of this distance between the moving object and the target 11, the amplifier 34 with sound level adjusting function adjusts a sound level which it has already set.

In order to drive the parametric speaker, the modulator needs to radiate an ultrasonic wave according to the amplitude of the voice signal. Therefore, an envelopment modulator for digital processing is suitable for this modulator since the envelopment modulator can faithfully extract a modulating process with the signal and can easily perform fine adjustment.

Figure 4:
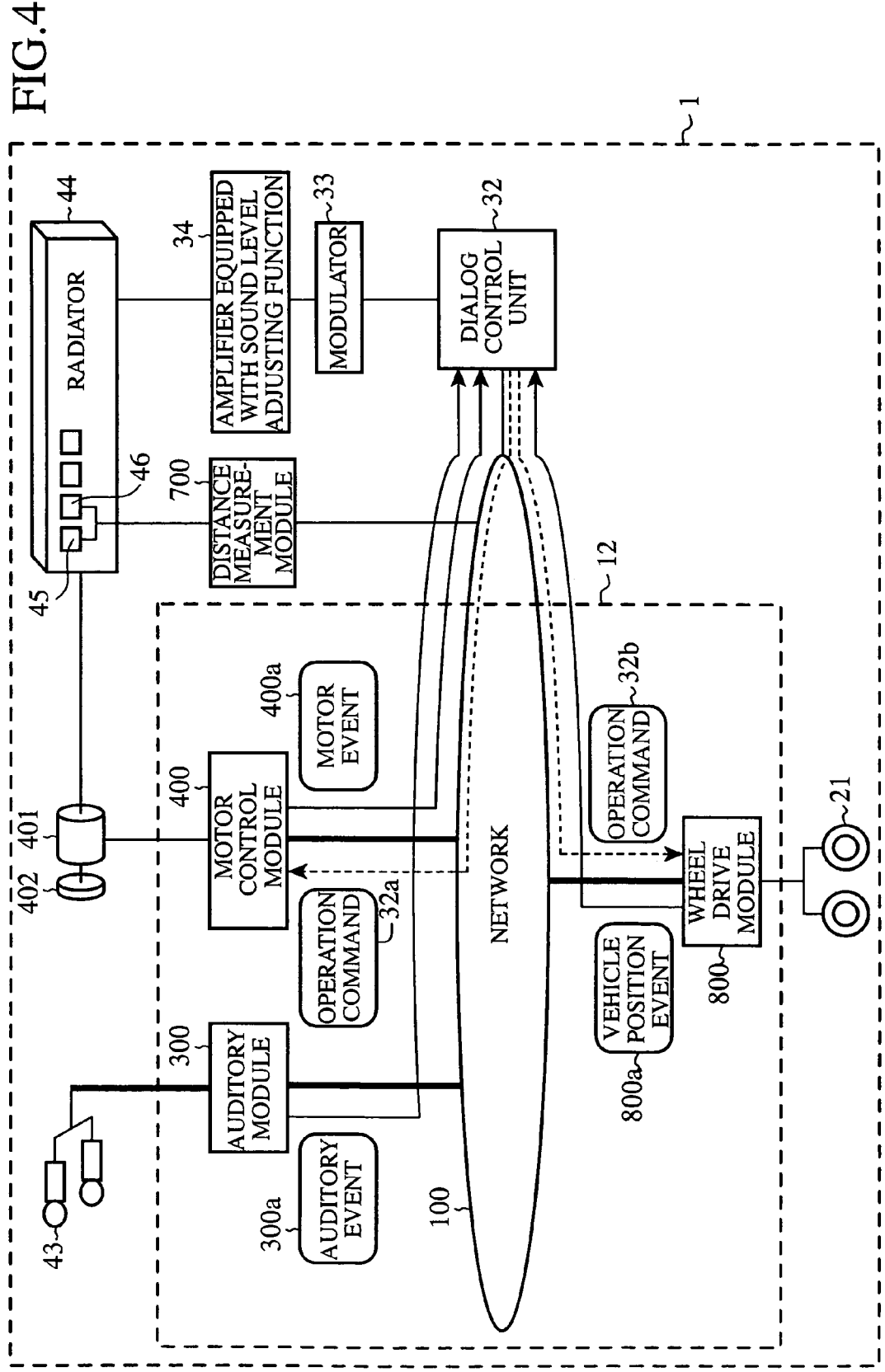
FIG. 4 is a diagram showing the whole of a system according to this embodiment 1.

FIG. 4 is a diagram showing the whole of a control system for controlling the moving object according to embodiment 1. As shown in FIG. 4, the control system according to this embodiment is provided with a network 100, and an auditory module 300, a motor control module 400, a distance measurement module 700, and a wheel drive module 800 which are connected to the network 100.

Although it is good to refer to patent reference 1 which discloses a conventional technology in order to know the details of the auditory module 300, the auditory module 300 is provided with the microphones 43, a peak extracting unit, a sound source localization unit, and an auditory event generating unit.

The auditory module 300 extracts a series of peaks for each of right-hand and left-hand channels from acoustical signals from the microphones 43, by using the peak extracting unit thereof, and pairs peaks extracted for the right-hand and left-hand channels with each other, the peaks having the same amplitude or similar amplitudes. The extraction of the peaks is carried out by using a band-pass filter which allows only data which satisfy, for example, conditions that their powers are equal to or larger than a threshold and are maximum values, and their frequencies range from 90 Hz to 3 kHz to pass therethrough. The magnitude of surrounding background noise is measured, and a sensitivity parameter, e.g., 10 dB is further added to the measured magnitude of surrounding background noise to define the threshold.

The auditory module 300 then finds out a more accurate peak for the right-hand and left-hand channels so as to extract a sound having a harmonic structure by using a fact that each of the peaks has a harmonic structure. Then, the auditory module 300 selects an acoustical signal having the same frequency from each of the right-hand and left-hand channels for each extracted sound by using the sound source localization unit, and acquires a binaural phase difference so as to localize a sound source. The auditory module 300 generates an auditory event 300*a* which consists of information about this localization and a time of the extraction of the localization information and transmits the auditory event to the dialog control unit 32 via the network 100.

The motor control module 400 is provided with a motor 401 and a potentiometer 402, a PWM control circuit, an AD conversion circuit and a motor control unit, and a motor event generating unit.

The motor control module 400 carries out drive control of the motor 401 via the PWM control circuit according to an operation command 32*a* from the dialog control unit 32 by using the motor control unit. Simultaneously, the motor control module 400 detects the rotational position of the motor by using the potentiometer 402 (or an angle detecting unit, such as an encoder), and extracts the orientation of the moving object via the AD conversion circuit by using the motor control. The motor event generating unit then generates a motor event 400*a* which consists of information about the direction of the motor and a time of the extraction of the information, and transmits the motor event to the dialog control unit 32 via the network 100.

The distance measurement module 700 is a component which measures the distance between the moving object and the target. The distance measurement module 700 controls the transmission of the ultrasonic wave from the ultrasonic transmit sensor 45, and measures the distance between the moving object and the target by measuring the time elapsed between the transmission and the reception of the ultrasonic wave by the ultrasonic receive sensor 46. The distance measurement module 700 has a preset sound level which is suited to the measured distance between the moving object and the target, and outputs a sound level setting signal which is suited to the measured distance to the amplifier 34 with sound level adjusting function. The dialog control unit 32 acquires the auditory event 300*a*, the motor event 400*a*, and a vehicle positioning event 800*a*, and then transmits operation commands 32*a* and 32*b* which are used for controlling the orientation of the robot so that the robot is oriented toward the target speaker to the motor control module 400 and wheel drive module 800, respectively. After checking that the robot has been oriented toward the desired orientation, the dialog control unit 32 generates a voice which is to be output to the target and transmits it to the modulator 33. The modulator 33 modulates the voice sent thereto from the dialog control unit 32, converts it into an ultrasonic wave having a format which can be outputted via the directional speaker, and then outputs the ultrasonic wave to the amplifier 34 with sound level adjusting function.

The amplifier 34 with sound level adjusting function adjusts the sound level of the ultrasonic wave according to a signal from the distance measurement module 700. For example, when the distance between the moving object and the target changes from 10 m to 5 m, the distance measurement module 700 outputs a setting signal indicating −6 dB to the amplifier 34 with sound level adjusting function. In this case, the amplifier 34 with sound level adjusting function sets its volume to −6 dB in response to the setting signal. The wheel drive module 800 controls the wheels 21 on the basis of the operation command 32*b* from the dialog control unit 32. The wheel drive module 800 simultaneously acquires the distance traveled by the wheels, and the rotational angle of the wheels from the potentiometer (or an optical encoder or a gyroscope), and converts them into information about the position and orientation of the vehicle. The wheel drive module 800 generates a vehicle position event 800*a* which consists of the extracted position information about the position of the vehicle, extracted orientation information, and a time of the extraction of these pieces of information, and transmits the vehicle position event to the dialog control unit 32 via the network 100.

When the moving object 1 is so constructed as to direct the head 4 toward the target without moving itself by rotating the head 4 horizontally, the moving object 1 can control a motor for rotating the head 4 horizontally so as to direct the head 4 toward the target. In addition, in a case where the emitter 44 cannot be oriented toward the head of the target, such as a case where the target is sitting down, a case where there is a small or large difference in height between the moving object and the target, or a case where the target is staying at a place with a level difference, the moving object 1 can control a motor for shaking the head 4 of the moving object 1 in upward and downward directions so as to control the direction in which the emitter 44 is oriented. Thus, in accordance with this embodiment 1, the emitter 44 is so constructed as to automatically adjust the angle at which the voice is to be directed toward a specific listener or a specific area in synchronization with a target tracking system 12, and to transmit the sound to it.

Hereafter, an example of the use of the above-mentioned moving object 1 will be explained. Information about a room in which the moving object 1 is to be used is inputted into the moving object 1 in advance, and information about how the moving object 1 moves according to a sound which it receives from which direction and at which location of the room is preset to the moving object. The target tracking system of the moving object 1 is further preset so that the moving object 1 determines that a human being is hiding and then takes an action (e.g., move) to look for the face of the human being when not finding out any human being in the direction of the sound source because of obstacles, such as walls of the room.

Figure 5:
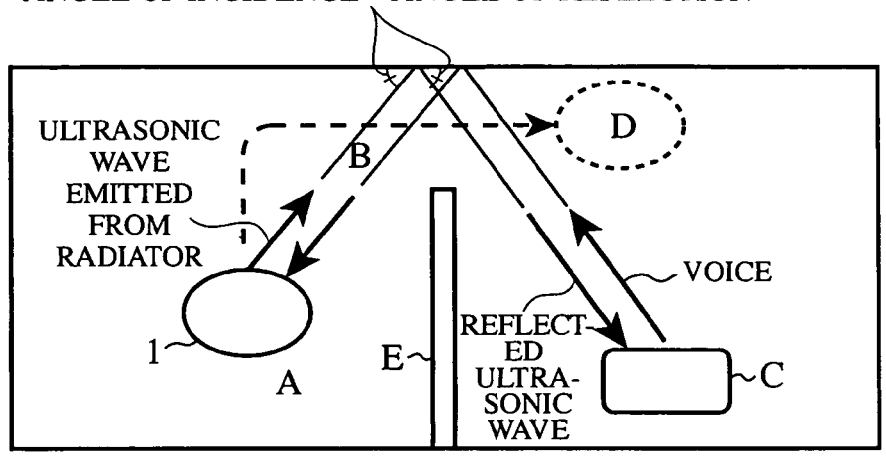
FIG. 5 is a diagram explaining a target tracking system according to embodiment 1 of the present invention.

For example, as shown in FIG. 5, when an obstacle E exists in the room, the moving object 1 may be unable to detect any visitor who has entered the room. In this case, the moving object 1 is preset so as to control the motor for driving the wheels 21 by using the wheel drive module 800 and to move toward a position D when the moving object 1 cannot find out a visitor C because the moving object is located at A and the sound source is placed in a direction of B. The moving object can thus eliminate blind spots in the angle of view which are caused by the obstacle E and so on by performing such an active operation.

The ultrasonic wave radiated from the emitter has a characteristic in which when reflected by a wall or the like, it propagates from the wall or the like at an angle of reflection which is the same as the angle of incidence at which it is incident upon the wall or the like. In consideration of this characteristic of ultrasonic waves, the moving object 1 can determine the direction of the visitor C by using the auditory module 300 without changing the position thereof, and can provide sounds to the visitor C using reflection of ultrasonic waves by a wall or the like.

When a visitor C enters the room, the moving object detects the visitor C's voice or another sound and then drives the motor for controlling the wheels 21 and the motor for controlling the position of the head 4 so that the emitter is oriented toward the direction from which the sound has come.

Figure 6:
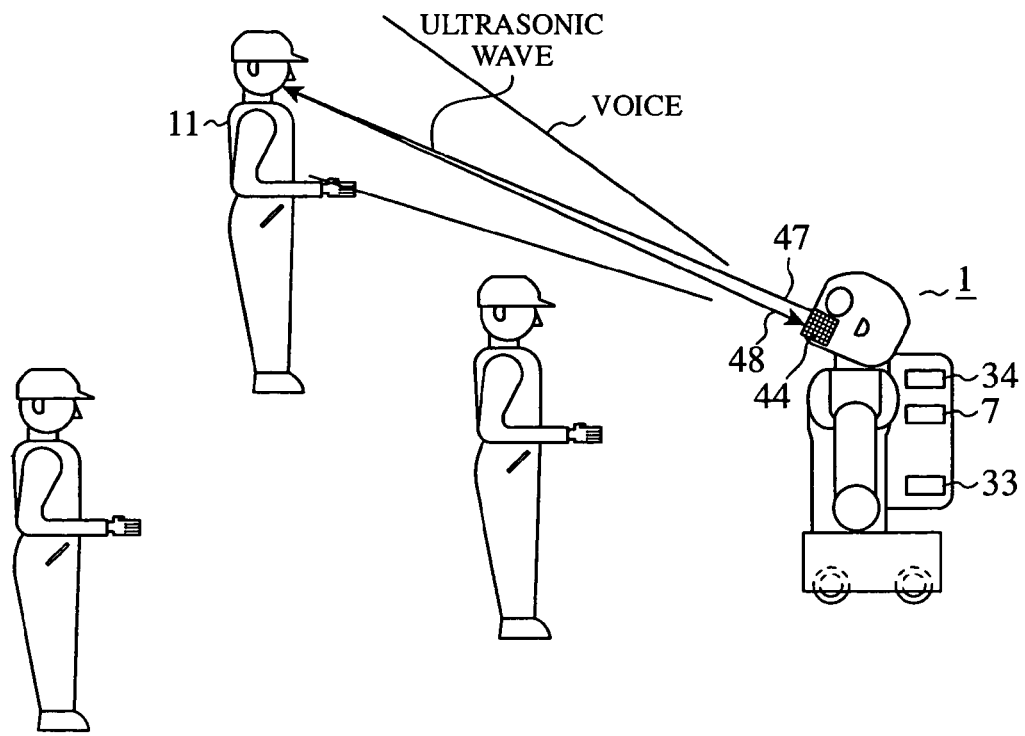
FIG. 6 is a diagram explaining a process of measuring the distance between the moving object according to embodiment 1 of the present invention, and a target.

As shown in FIG. 6, when specifying the target 11, the system according to this embodiment 1 controls the distance measurement module 700 so as to measure the distance between the moving object and the target 11. The system computes the distance by controlling transmission of an ultrasonic wave by the ultrasonic transmit sensor 45 and then measuring the time that has elapsed before reception of a reflected wave of the ultrasonic wave by the ultrasonic receive sensor 46. A distance signal indicating the distance is inputted to the amplifier 34 with sound level adjusting function. In a case where the emitter does not have any ultrasonic transmit sensor 45, a carrier for use in the ultra-directional speaker can be used as an ultrasonic wave for detection of the distance between the moving object and the target.

In the above-mentioned embodiment, the example in which the emitter 44 is disposed in the head 4 of the moving object is explained. The above-mentioned embodiment is not limited to this example. For example, the moving object can be so constructed as to change the orientation of the emitter 44 of the ultra-directional speaker, instead of rotating and shaking the head 4 using motors. Furthermore, the position where the emitter 44 is disposed is not limited to the head 4, and therefore the emitter 44 can be disposed in any position of the moving object 1.

In above-mentioned embodiment 1, although the example in which one emitter 44 is disposed is explained, two or more emitters 44 can be disposed and the orientation of each of the two or more emitters 44 can be controlled independently. According to this structure, the moving object can provide sounds only to two or more specific persons, respectively. In above-mentioned embodiment 1, the example in which the moving object handles voices is explained. This embodiment 1 can also be applied to transmission of various sounds including music.

Embodiment 2

In this embodiment 2, a robot communications system to which a moving object equipped with ultra-directional speaker in accordance with the present invention is applied will be explained. This robot communications system particularly implements a simultaneous dialog function and a whispering function. The simultaneous dialog function is the one of performing a process of hearing while talking to someone to talk to by performing voice recognition while making a voice. The whispering function is the one of telling information only to a specific partner with a voice as if to whisper in the person's ear. Such the simultaneous dialog function and whispering function are implemented by using an ultra-directional speaker.

First, the characteristics of the ultra-directional speaker will be explained.

Figure 7:
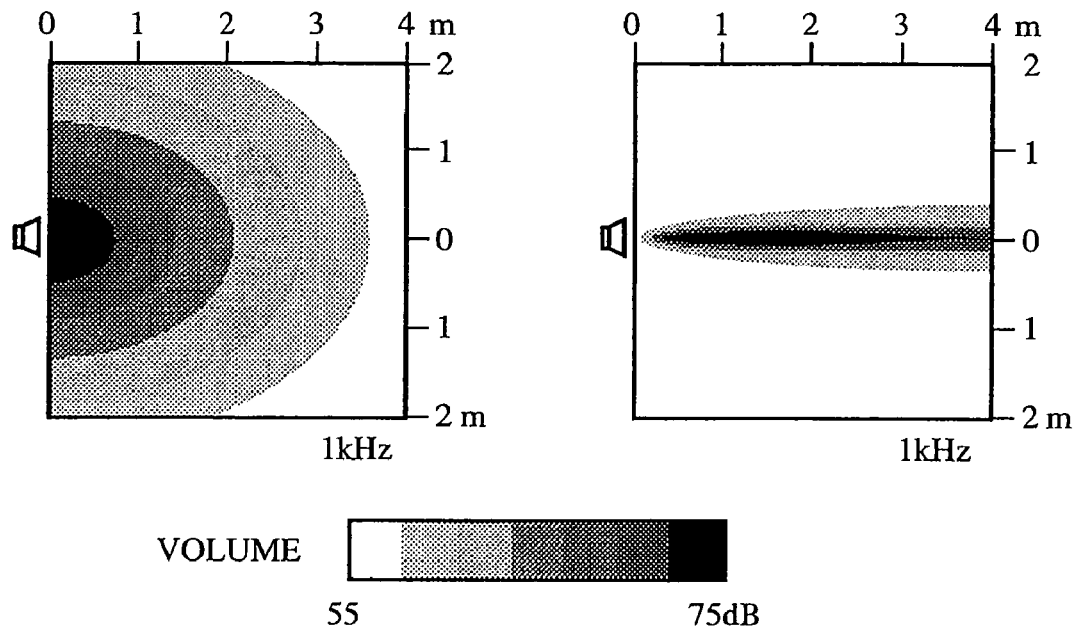
FIG. 7 is a diagram showing results of measurement of the directivity of the ultra-directional speaker and that of a non-directional speaker.
Figure 7:
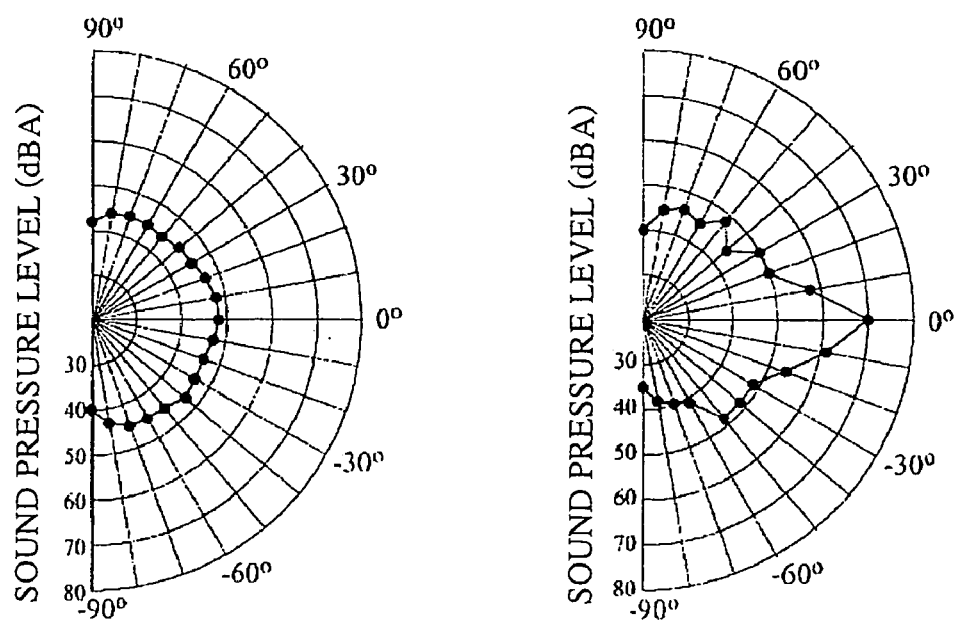

FIG. 7 shows results of actual measurements of the directivity of the ultra-directional speaker and that of a nondirectional speaker. In FIG. 7, as the actual measurement result of the directivity of the ultra-directional speaker, the contour of the sound pressure level of a sound which is emitted from the ultra-directional speaker and propagates through the air is shown, the contour being measured in such a manner that the detected sound has a frequency of 1 kHz, and measurement values of the sound pressure levels are shown on a lower side of FIG. 7. It is apparent from comparison between the figures shown on the upper side of FIG. 7 that a sound emitted from the nondirectional speaker spreads as shown in FIG. 7(a) so that it can be heard in surroundings. On the other hand, it is apparent that a sound emitted from the ultra-directional speaker propagates so as to be concentrated to an area that is placed in front of the ultra-directional speaker. Since the ultra-directional speaker uses an ultrasonic wave as a carrier, its directivity is very high. The whispering function of sending a voice only to a specific partner is thus implemented.

As shown on the upper side of FIG. 7(b), since the sound wave needs to propagate through the air to such an extent that the nonlinearity in the air becomes effective, an audible sound is generated at a location distant from the speaker unit by 0.5 to 1.0 m. That is, hardly any audible sound occurs at a location distant from the speaker unit by 0.5 m or less. This shows that hardly any noise occurs at the time of recognizing a voice from the partner. It is clear that since the signal-to-noise (S/N) ratio becomes large, the use of the ultra-directional speaker makes it possible for the moving object to easily recognize the voice from the partner.

The measurements of the sound pressure levels shown on the lower side of FIG. 7 were carried out in a room having a size of 3 m×5 m and a reverberation time of about 0.08 seconds. A noise meter was placed at a distance of 1.0 m from the speaker which was a measurement target. With the direction which is in front of the speaker being set to 0 degrees, the sound pressures were measured at intervals of 10 degrees in a range of ☐} 90 degrees. dBA which is obtained by performing weighting of power for every frequency so that it becomes close to the sensitivity of human beings' sense of hearing is used as an index of measurement.

As shown on the lower side of FIG. 7(b), in the ultra-directional speaker, there was an increase of about 20 dBA(s) in the power in the direction of the directivity of the ultra-directional speaker. As can be seen from the lower side of FIG. 7(b), the sound pressures of the sound emitted from the ultra-directional speaker are unstable in directions of the sides of the speaker. This is because since the ultra-directional speaker uses an ultrasonic wave as the carrier, the attenuation factor of the signal is small, and therefore reflected waves reflected by a wall, a floor, and a ceiling reach a robot's microphones while maintaining its power constant.

Therefore, there is a possibility that the only use of the ultra-directional speaker which provides high directivity in the beam shape causes troubles to occur in the voice recognition. In contrast, in accordance with this embodiment 2, in order to implement the simultaneous dialog function of hearing while talking to a partner, the moving object controls the gain of the carrier, as will be mentioned below.

Figure 8:
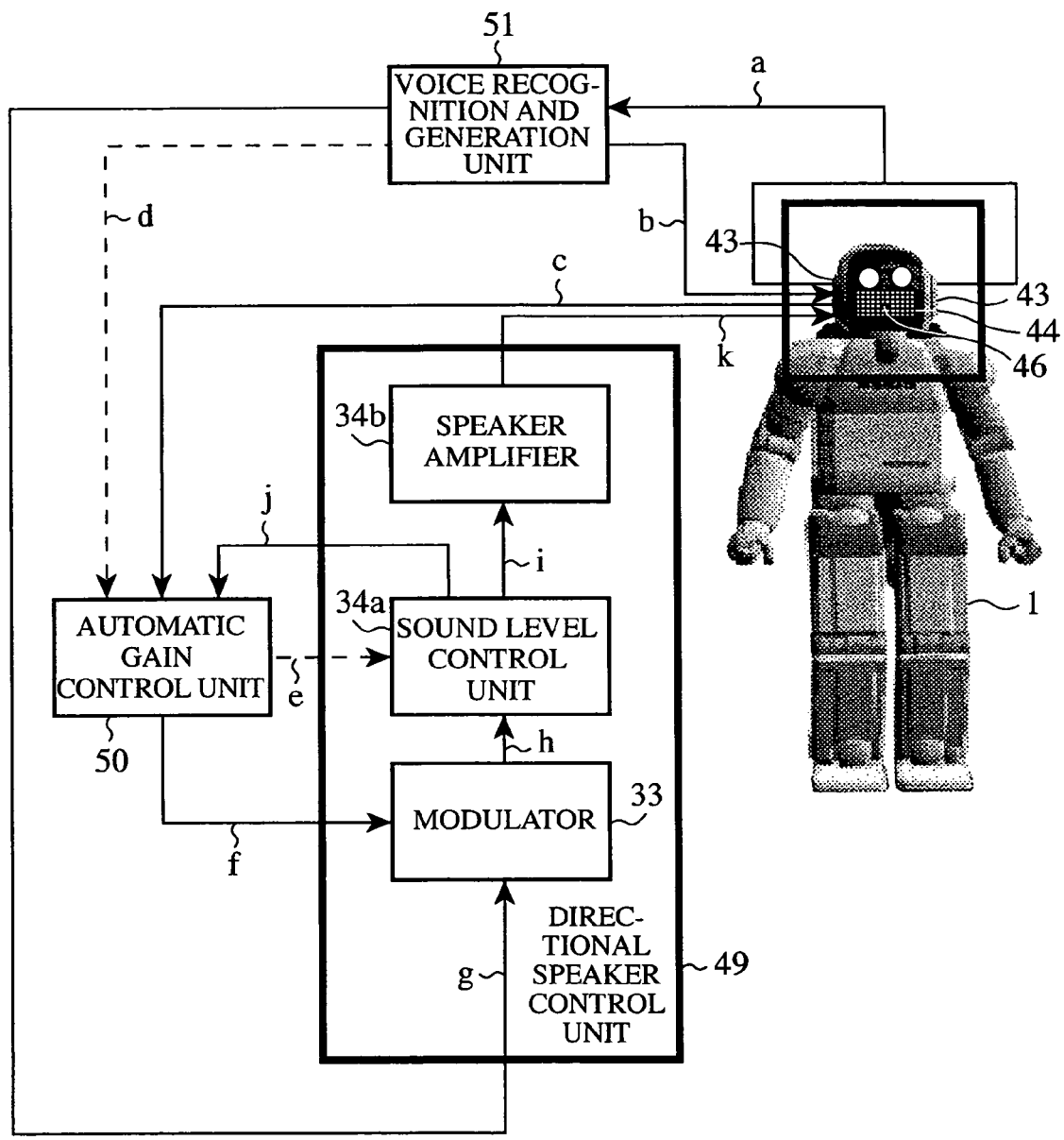
FIG. 8 is a block diagram showing the structure of a moving object equipped ultra-directional speaker in accordance with embodiment 2 of the present invention.

FIG. 8 is a block diagram showing the structure of the moving object equipped with ultra-directional speaker in accordance with embodiment 2 of the present invention, and shows a case where the robot communications system to which the moving object equipped with ultra-directional speaker is applied makes a dialog with a person. This system includes a humanoid robot which is an embodiment of the moving object 1 (hereafter referred to as the robot 1 where appropriate), a directional speaker control unit 49, an automatic gain control unit 50, a voice recognition and generation unit 51. The robot 1 is provided with a normal nondirectional speaker, such as a low-directional speaker, which is installed in the body thereof, and a pair of microphones 43 which are arranged at the ears on the right-hand and left-hand sides of the head thereof, as shown in FIG. 1. The robot 1 is also provided with an emitter 44 and an ultrasonic receive sensor 46 which constitute the ultra-directional speaker at the mouth thereof. The directional speaker control unit 49, automatic gain control unit 50, voice recognition and generation unit 51 can be embodied as a module of a program which causes a computer which constitutes the system according to this embodiment 2 to carry out predetermined processes.

The directional speaker control unit 49 is provided with a modulator 33, a sound level control unit 34a, and a speaker amplifying unit 34b. The modulator 33 outputs an ultrasonic carrier h which is modulated with an input audible sound g to the sound level control unit 34a. The frequency of the carrier h is set to nearly 40 kHz which provides the highest performance in respect of the sound quality and volume. The sound level control unit 34a controls the gain of the carrier according to a command e from the automatic gain control unit 50. An output of the sound level control unit 34a is sent to the speaker amplifying unit 34b as a signal i, and to the automatic gain control unit 50 as a signal j.

The ultrasonic signal j sent to the automatic gain control unit 50 is used as a reference signal for estimating the distance to the target. An ultrasonic signal k amplified by the speaker amplifying unit 34b is sent to the ultra-directional speaker disposed at the mouth of the head of the robot, and is then outputted via the emitter 44. The automatic gain control unit 50 controls the power of the ultrasonic wave so that the corresponding audible sound reaches only the target person on the basis of the distance information acquired by the ultrasonic receive sensor 46. The automatic gain control unit estimates the distance to the person using the time difference between the ultrasonic signal j from the sound level control unit 34a and a signal c from the ultrasonic receive sensor 46 mounted in the ultra-directional speaker. Next, a gain control algorithm will be shown below.

1. The automatic gain control unit 50 outputs an impulse signal f to the modulator 33 of the directional speaker control unit 49 at predetermined intervals (e.g., at intervals of 100 ms) However, when receiving a talk event d from the voice recognition and generation unit 51, the automatic gain control unit 50 turns on or off the output of the impulse signal according to the contents of the talk event.

2. The modulator 33 of the directional speaker control unit 49 generates the ultrasonic wave h which is modulated with the impulse signal f, and sends it, as the reference signal j, to the automatic gain control unit 50 via the sound level control unit 34a. Simultaneously, this modulated signal is also sent to the ultra-directional speaker via the sound level control unit 34a and speaker amplifying unit 34b, and is then outputted as an ultrasonic wave.

3. The ultrasonic receive sensor 46 receives an ultrasonic reflection signal c which results from a reflection of the ultrasonic wave by the person who is in front of the robot 1, and the automatic gain control unit 50 simultaneously accepts the reflection signal c and reference signal j at a fixed sampling rate (e.g., at a sampling rate of 192 kHz).

4. The automatic gain control unit 50 extracts rise times $\tau 1$ and $\tau 2$ of the impulse signal f for the reference signal j and reflection signal c from the reference signal j and reflection signal c by using a zero cross method. The distance measurement module 700 shown in FIG. 3 computes the distance D between the robot and the person from the rise times $\tau 1$ and $\tau 2$ of the impulse signal f, which are extracted by the automatic gain control unit 50, and the acoustic velocity v (340 m/s) by using the following equation (1):

$$D=(\tau 2-\tau 1)\times v \qquad (1)$$

5. According to the estimated distance D, the automatic gain control unit 50 selects an optimal gain value. The optimal gain value is experimentally predetermined for a predetermined gap (e.g., 1 m). Finally, the automatic gain control unit 50 outputs a command e for setting the selected gain value to the sound level control unit 34a.

The voice recognition and generation unit 51 recognizes a voice collected by the microphones 43, and sends out a voice signal b or k to either the ultra-directional speaker or the nondirectional speaker. When carrying out a voice output via the ultra-directional speaker, the voice recognition and generation unit 51 outputs a voice signal k which is a high-directivity ultrasonic wave via the directional speaker control unit 49 to the ultra-directional speaker, and the ultra-directional speaker then outputs the voice signal. On the other hand, when carrying out a voice output from the nondirectional speaker, the voice recognition and generation unit 51 outputs a voice signal b to the nondirectional speaker.

A voice recognition engine of the voice recognition and generation unit 51 is an existing one. When starting or ending the voice output from the ultra-directional speaker, the voice recognition engine transmits the talk event d for switching between the on and off states of the distance measurement processing to the automatic gain control unit 50.

Next, results of an evaluation test of the whispering function which are obtained by performing the above-mentioned gain control will be explained.

Figure 9:
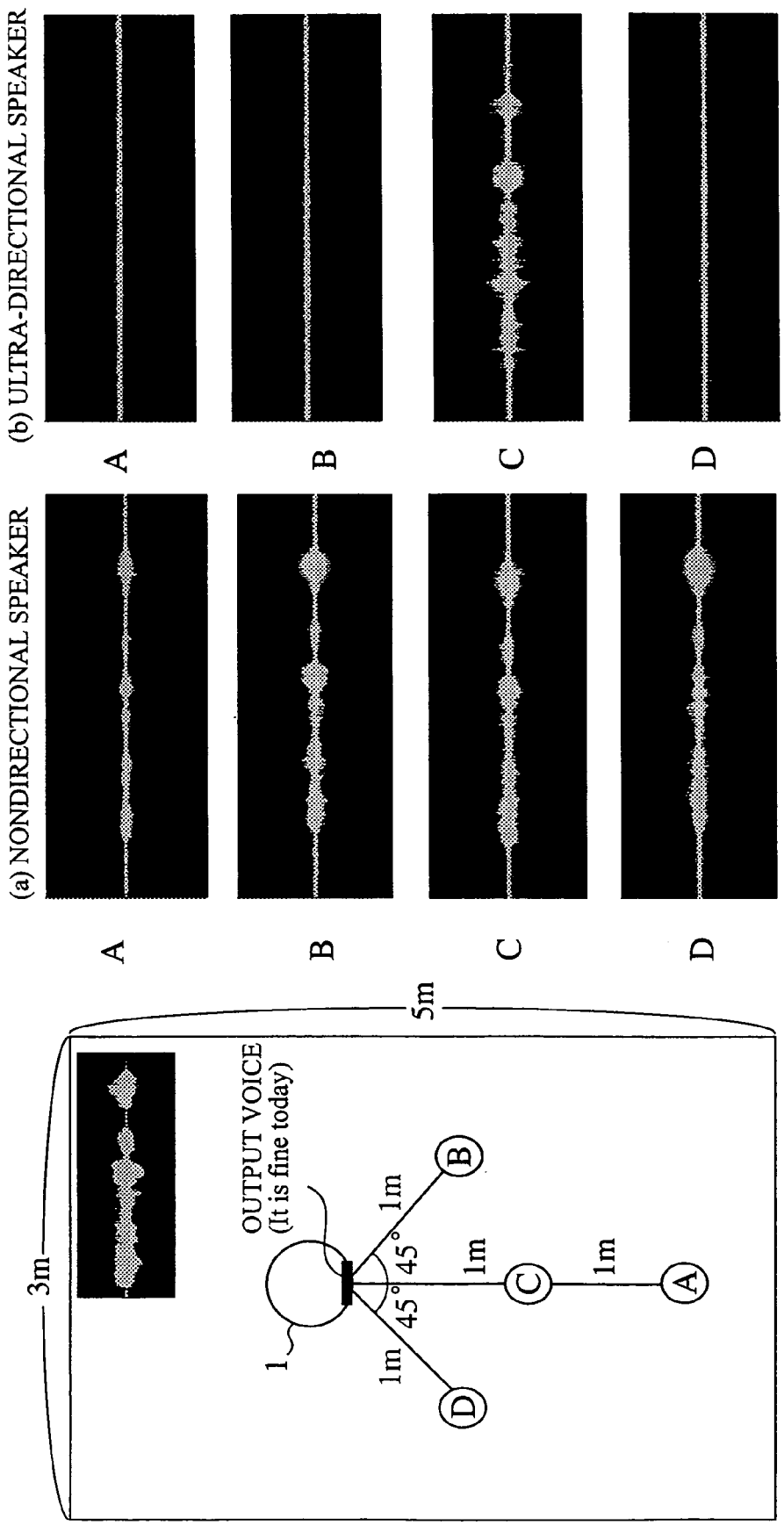
FIG. 9 is a diagram showing an example of the operation of a system of FIG. 8.

FIG. 9 is a diagram showing an example of the operation of the system of FIG. 8. In this test, an example "It is fine today" was outputted by voice from both the nondirectional speaker and ultra-directional speaker which are mounted in the robot 1 shown in FIG. 8, and measurements were carried out at each of locations A to D in a measurement room (having a size of 3 m×5 m) shown on a left side of FIG. 9 (the room has a reverberation time of 0.08 seconds at a frequency of 1 khz). Figures shown on a central side of FIG. 9 show sound waveforms which are measurement results at the points A to D when the above-mentioned example is outputted by voice from the nondirectional speaker, and figures shown on a right side of FIG. 9 show sound waveforms which are measurement results at the points A to D when the above-mentioned example is outputted by voice from the ultra-directional speaker. A sound waveform shown on the left side of FIG. 9 is the waveform of the original voice "It is fine today."

It is apparent from comparison between the measurement results shown in the central and right sides of FIG. 9 between the point A and the point C that in the case of the ultra-directional speaker, an audible sound exists only at the point C, the high directivity is maintained, and the gain control is performed well. In other words, the ultra-directional speaker can transmit a voice only to someone to talk to at the point C, and hardly any audible sound exists at other points. Thus, the high-concealment whispering function is implemented.

Next, results of an evaluation test of the simultaneous dialog function which are obtained by performing the above-mentioned gain control will be explained.

As a facility used for the evaluation test of the simultaneous dialog function, a speaker 52 which is a sound source assumed to be someone to talk to was placed in a measurement room so that it was distant from the front of the robot-shown in FIG. 8 by 1 m, as shown in FIG. 10. The measurement room had a reverberation time of 0.08 seconds at a frequency of 1 kHz. In the evaluation test, 216 phoneme balance words are output from the speaker 52 for sound source on the three following conditions, and isolated word recognition is performed on each of the 216 phoneme balance words.

(1) A voice is simultaneously output from the ultra-directional speaker.

(2) A voice is simultaneously output from the ultra-directional speaker. However, the output gain is optimally controlled so that the voice reaches only a user who can be standing at the speaker 52 for sound source.

(3) A voice is simultaneously output from the nondirectional speaker disposed within the robot 1. However, the output power at the speaker 52 for sound source is controlled so as to become equal to that on the condition (2).

FIG. 11 shows the power of the voice at the microphones 43 of the robot 1 (i.e., at the ears of the robot) and the power of the voice at the speaker 52 for sound source in a case where no sound is outputted from the speaker 52 for sound source on the above-mentioned conditions (1) to (3), that is, when a voice is outputted only from the ultra-directional speaker or the nondirectional speaker. As can be seen from FIG. 11, the power of the voice outputted from the ultra-directional speaker which is measured at the microphones 43 (i.e., at the ears of the robot) is smaller than that at the speaker 52 for sound source, in contrast to the case of the nondirectional speaker.

The output from the speaker 52 for sound source was changed from 70 dBA to 90 dBA in increments of 5 dBA. A voice outputted from the speaker 52 for sound source experienced an attenuation of 15 dBA until reaching the ears of the robot 1. For this reason, there was a change of 55 dBA to 75 dBA in the voice power at the ears of the robot. An acoustic model for voice recognition was acquired by outputting each of the 216 phoneme balance words from the speaker 52 for sound source in a state where the power source of the robot 1 is turned on and there are no noise sources other than the robot 1, and by processing each of the 216 voices collected by the microphones 43 of the robot 1 using an existing voice recognition algorithm.

FIG. 12 is a graph showing results of the above-mentioned isolated word recognition processing. In the figure, the horizontal axis shows the power (dBA) of each voice outputted from the speaker 52 for sound source, and the vertical axis shows an answer rate for isolated words (%). A curve which is denoted by a reference character A and which connects triangular plots shows results of the isolated word recognition processing on the above-mentioned condition (2). Furthermore, a curve which is denoted by a reference character B and which connects rectangular plots shows results of the isolated word recognition processing on the above-mentioned condition (1), and a curve which is denoted by a reference character C and which connects circular plots shows results of the isolated word recognition processing on the above-mentioned condition (3). As can be seen from FIG. 12, the voice recognition results which were obtained on the condition (2) that the gain control was optimally performed are the best, the voice recognition results which were obtained on the condition (1) that no gain control was performed are the second, and the voice recognition results which were obtained on the condition (3) that the nondirectional speaker was used are the worst.

When the voice power was 90 dBA, the answer rate for words when using the ultra-directional speaker reached about 90%, whereas the answer rate for words when using the nondirectional speaker reached about 80%. The voice recognition results which were obtained by using the nondirectional speaker got worse rapidly when the voice output of the speaker 52 for sound source was equal to or less than 80 dBA. On the other hand, the voice recognition results which were obtained by using the ultra-directional speaker showed the same tendency when the voice output of the speaker 52 for sound source was reduced to 70 dBA.

As shown in FIG. 11, both the ultra-directional speaker whose gain was optimally controlled and the nondirectional speaker had much the same voice output level (62 dBA) at the speaker 52 for sound source. However, as shown in FIG. 12, there was a large difference in the rate of isolated word recognition between the ultra-directional speaker whose gain was optimally controlled and the nondirectional speaker, and it was 40% or more at the maximum (when the voice output of the speaker 52 for sound source was 80 dBA). Although the output (70 dBA) of the ultra-directional speaker whose gain was not controlled was larger than the output (62 dBA) of the nondirectional speaker at the speaker 52 for sound source, the rate of isolated word recognition obtained when using the ultra-directional speaker whose gain was not controlled is higher than the rate of isolated word recognition obtained when using the nondirectional speaker. It can be seen from the above description that when constructing a talking device which implements the simultaneous dialog function, the ultra-directional speaker achieves higher performance than the nondirectional speaker.

When the output of the speaker 52 for sound sources was reduced to 70 dBA, as shown in FIG. 12, the rate of isolated word recognition obtained when using the ultra-directional speaker decreased rapidly. This is because the background noise caused the decrease. The voice power at the ears of the robot 1 was 55 dBA when the output of the speaker 52 for sound source was 70 dBA. On the other hand, according to FIG. 11, the background noise at the time when the power source of the robot 1 was turned on was also 55 dBA. This shows that the S/N ratio was 0 dB, and it can be considered that the background noise influenced the voice recognition results strongly.

As mentioned above, by using the ultra-directional speaker and by appropriately performing gain control on the output of the ultra-directional speaker, a high-concealment whispering function of transmitting a voice only to a specific area can be implemented. In addition, since it is possible to reduce generation of reflected waves of the ultrasonic wave which become noise in the voice recognition, a simultaneous dialog function of hearing while talking to a partner can be also implemented.

INDUSTRIAL APPLICABILITY

As mentioned above, the moving object equipped with ultra-directional speaker in accordance with the present invention is provided with a modulator for modulating an ultrasonic carrier signal with an input electric signal from an audible sound signal source, and an emitter for emitting an output signal of the modulator. The moving object equipped with ultra-directional speaker is therefore suitable for application to a robot equipped with audiovisual system, etc.

The invention claimed is:

1. A moving object equipped with ultra-directional speaker, said moving object comprising:
    a voice recognition and generation device for performing voice recognition on a voice detected by a voice detecting device, and for generating a voice signal;
    a modulator for modulating an ultrasonic carrier signal with the voice signal from the voice recognition and generation device so as to output a modulated voice signal;
    an automatic gain control device for measuring a distance between said moving object and a target and controlling gain adjustment of a sound level of said modulated voice signal based on said distance between said moving object and said target; and
    an emitter for emitting the modulated voice signal adjusted by the automatic gain control device,
    wherein when starting or ending generating said voice signal, said voice recognition and generation device sends a talk event signal to the automatic gain control device so as to respectively start measuring or stop measuring said distance between said moving object and said target.

2. The moving object equipped with ultra-directional speaker according to claim 1, wherein said moving object comprises a target direction detecting device for detecting a direction of a target to which a voice is to be provided, and an emitter orientation control device for controlling the emitter so that the emitter is oriented toward the target which is identified by said target direction detecting device.

3. The moving object equipped with ultra-directional speaker according to claim 1, wherein the emitter is provided with two or more ultrasonic vibration elements, and an ultrasonic receive sensor or an ultrasonic transmit sensor consists of at least one of said two or more ultrasonic vibration elements.

4. The moving object equipped with ultra-directional speaker according to claim 3, wherein said automatic gain control device determines a time that has elapsed before receiving a reflection of said ultrasonic signal from said target so as to measure a distance to said target on the basis of the determined time.

5. The moving object equipped with ultra-directional speaker according to claim 4, further comprising a gain-adjustable amplifier connected to said automatic gain control device, a gain of said gain-adjustable amplifier being adjusted based on said distance between said moving object and said target such that the sound level of said modulated voice signal is adjusted.

6. A method of controlling an output gain of a moving object equipped with an ultra-directional speaker for transmitting a modulated signal which is obtained by modulating an ultrasonic carrier signal with an audible sound signal, said method comprising the steps of:
    transmitting an ultrasonic signal to a target by way of said ultra-directional speaker, and then determining a time that has elapsed before receiving a reflection of said ultrasonic signal from said target;
    estimating a distance between said moving object and said target on the basis of said determined time; and
    generating a voice signal by a voice recognition and generation device to be modulated as the modulated signal;
    adjusting a gain of a sound level of said modulated signal based on said estimated distance between said moving object and said target,
    wherein when starting or ending generating said voice signal, said voice recognition and generation device sends a talk event signal so as to respectively start or end the estimating step.

7. A computer-readable medium having a program that causes a computer to function as a control system for controlling a moving object equipped with an ultra-directional speaker for transmitting a modulated signal which is obtained by modulating an ultrasonic carrier signal with an audible sound signal, wherein said program causes said computer to function as
    a voice recognition and generation device for performing voice recognition on a voice detected by a voice detecting device, and for generating a voice signal to be modulated as the modulated signal;
    a distance detecting means for transmitting an ultrasonic signal to a target by way of said ultra-directional speaker, and for determining a time that has elapsed before receiving a reflection of said ultrasonic signal from said target so as to measure a distance between said moving object and said target on the basis of the determined time; and
    an automatic gain control means for controlling gain adjustment of a sound level of said modulated signal based on said distance between said moving object and said target,
    wherein when starting or ending generating said voice signal, said voice recognition and generation device sends a talk event signal to the distance detecting means so as to respectively start measuring or stop measuring said distance between said moving object and said target.

* * * * *